(12) United States Patent
Bradley

(10) Patent No.: US 11,719,276 B1
(45) Date of Patent: Aug. 8, 2023

(54) ARTICULATING CONSTRICTING CLAMP

(71) Applicant: Keith Aaron Bradley, La Farge, WI (US)

(72) Inventor: Keith Aaron Bradley, La Farge, WI (US)

( * ) Notice: Subject to any disclaimer, the term of this patent is extended or adjusted under 35 U.S.C. 154(b) by 174 days.

(21) Appl. No.: 17/391,010

(22) Filed: Aug. 1, 2021

(51) Int. Cl.
*F16C 11/10* (2006.01)
*A47B 81/00* (2006.01)

(52) U.S. Cl.
CPC .......... *F16C 11/106* (2013.01); *A47B 81/005* (2013.01)

(58) Field of Classification Search
CPC ............................. F16C 11/106; A47B 81/005
See application file for complete search history.

(56) References Cited

U.S. PATENT DOCUMENTS

| | | | | |
|---|---|---|---|---|
| 3,023,990 A * | 3/1962 | Gunthel, Jr. | ........... | H01B 17/16 248/70 |
| 3,516,630 A * | 6/1970 | Janssens | ............. | F16C 11/0614 248/70 |
| 4,901,970 A * | 2/1990 | Moss | ..................... | A01K 97/10 403/385 |
| 6,719,255 B2 * | 4/2004 | Chen | ...................... | H04R 1/026 248/323 |
| 7,350,755 B1 * | 4/2008 | Harrison | ................. | B63B 17/00 248/323 |

* cited by examiner

*Primary Examiner* — Anita M King

(57) ABSTRACT

The invention is a Clamp system that is able to rotate and swivel on a base allowing it to self-align itself to the part being secured. When the clamp is tightened to the part it is securing, the base, clamp and part all become rigid and unable to swivel or rotate.

14 Claims, 4 Drawing Sheets

ARTICULATING CONSTRICTING CLAMP

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Field of the Invention

The present invention relates to a system to clamp a rigid structure to a fixed surface that may not be parallel to the rigid structure. The invention will self-align when tightened to the rigid structure to create a solid mount.

Attaching a rigid pipe, tube, beam, etc. to a surface at multiple points that are not parallel to the tube or each other creates a challenge of having to make adjustments to the fixed surface to allow them to be connected without creating stress, twisting or distortion of the tube. The invention's ability to swivel and tilt allows for the clamps to be mounted to a surface that is uneven and self-align to the tube without creating stress in the tube, clamp or surface. Further, tightening screws that are located at the top of the clamp assembly makes for easy access and easy installation. The invention also allows for the clamps to be mounted to a surface and the tube to be secured, slid into one clamp and rotated/swiveled into position to then slide it into another clamp. This creates the ability to use non-removable screws on the clamp for secure installation preventing the tube from being removed after installation.

BRIEF SUMMARY OF THE INVENTION

The invention consists of a base that is secured to a fixed surface using mechanical fasteners, adhesives, or fusion. Said base has a domed shaped exterior and a matching cavity on the inside for a lug that is able to rotate, swivel and articulate. The invention has a mid clamp that loosely mates to the base and can swivel and rotate on the base. Inside of and contained by the mid clamp is a nut plate which is loosely connected to the lug inside of the base. The invention also includes a top clamp which straddles the tube being secured by the invention. This top clamp is fastened to the nut plate, and when it is tightened, the lug is pulled tight to the bottom of the base, and as the nut plate sits lower than the contacting surface of the mid clamp, the mid clamp is sandwiched between the tube and base creating a solid assembly that can no longer rotate or swivel.

BRIEF DESCRIPTION OF THE DRAWINGS

The drawings in this application illustrate the interaction of the components.

DETAILED DESCRIPTION OF THE INVENTION

Figure 1:
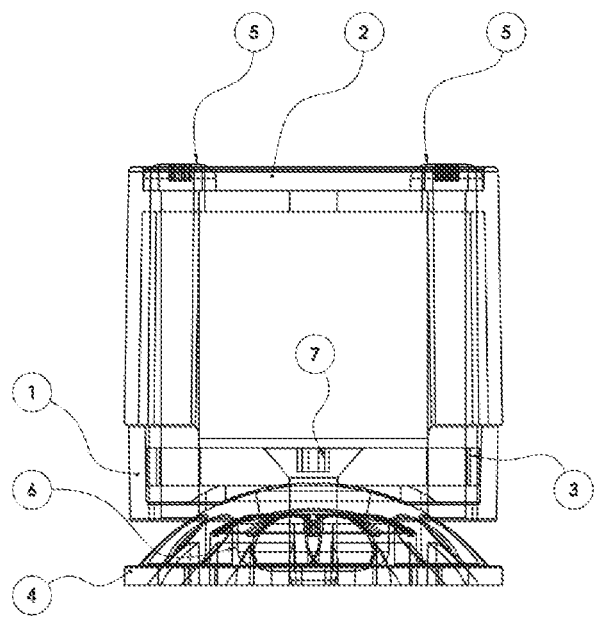
FIG. 1 shows the front view of the Articulating Constricting Clamp in its preferred embodiment.

FIG. 1 shows a front view of a preferred embodiment of the articulating constricting clamp comprising a top clamp (2), countersunk screw (7), nut plate (3), which serves as a fastening plate, mid clamp (1), which serves as an externally mating receptacle, bulbous base (4), top clamp screws (5) and lug (6).

Figure 2:
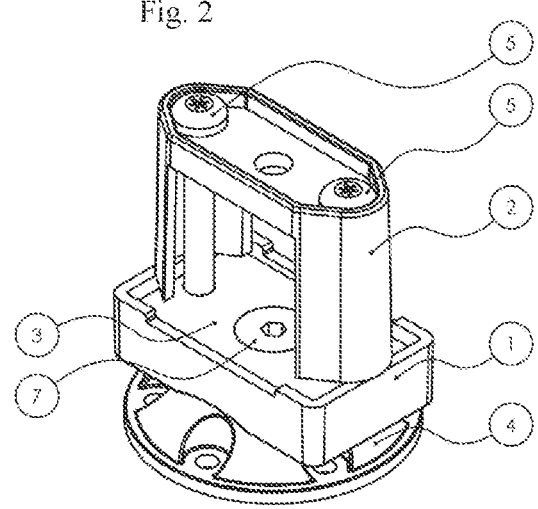
FIG. 2 shows an isometric view of the Articulating Constricting Clamp in its preferred embodiment.

FIG. 2 shows an isometric view of the articulating constricting clamp comprising a top clamp (2), countersunk screw (7), nut plate (3), mid clamp (1), top clamp screws (5) and bulbous base (4).

Figure 3:
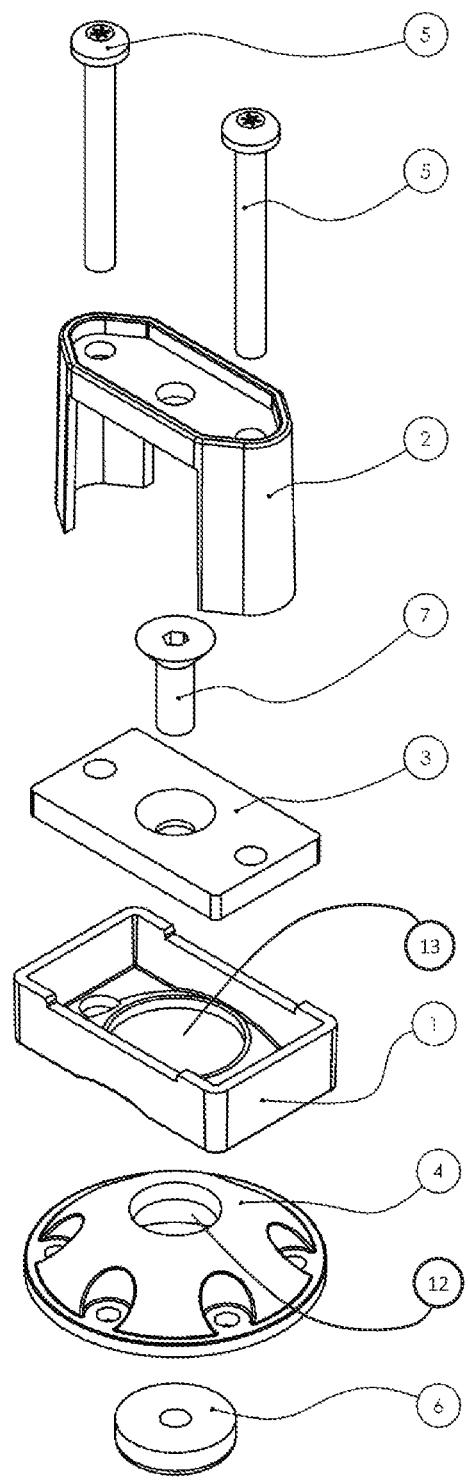
FIG. 3 shows an exploded isometric view of the Articulating Constricting Clamp in its preferred embodiment.

FIG. 3 shows an isometric exploded view of the articulating constricting clamp comprising a top clamp (2), countersunk screw (7), nut plate (3), a central aperture (13) extending through the mid clamp (1), a central hole (12) extending through the bulbous base (4), top clamp screws (5) and lug (6).

Figure 4:
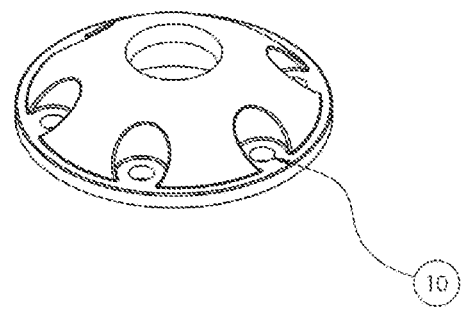
FIG. 4 shows an isometric view of the base (4) and the mounting hole (10) in its preferred embodiment.

FIG. 4 shows an isometric view of the bulbous base (4) with the mounting hole (10).

Figure 5:
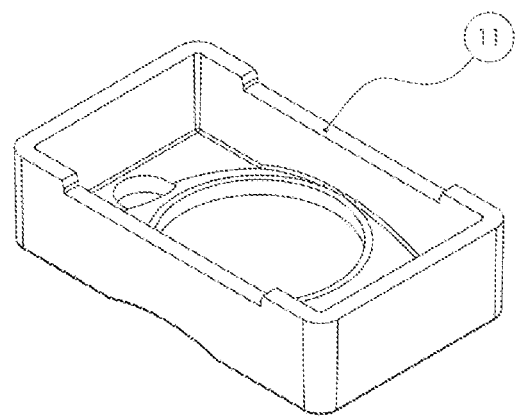
FIG. 5 shows an isometric view of the mid clamp (1) and the pocket cutout (11) in its preferred embodiment.

FIG. 5 shows an isometric view of the mid clamp (1) with the mounting pocket cutout (11).

Figure 6:
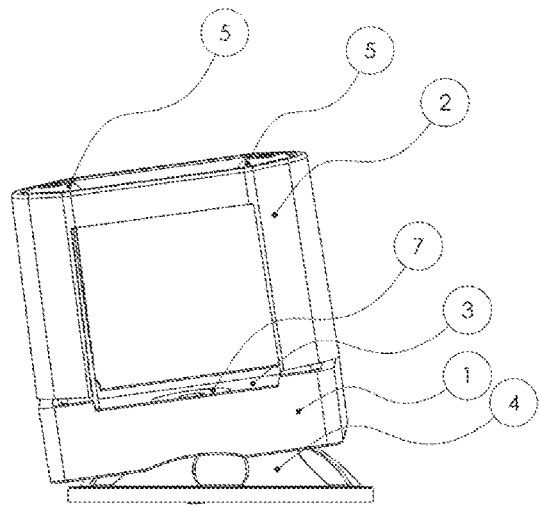
FIG. 6 shows a front view of the Articulating Constricting Clamp articulated at 10 degrees in the preferred embodiment.

FIG. 6 shows a front view of the Articulating Constricting Clamp articulated at 10 degrees in the preferred embodiment.

Figure 7:
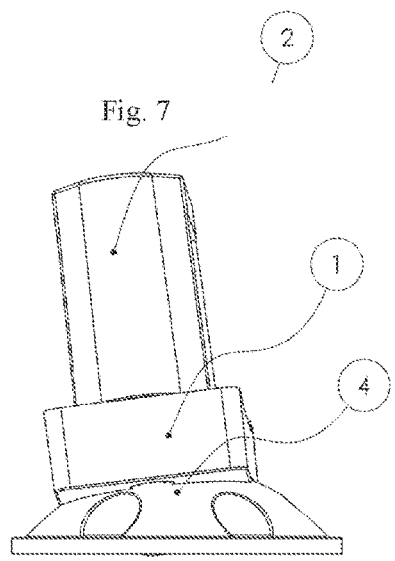
FIG. 7 shows a side view of the Articulating Constricting Clamp articulated at 10 degrees in the preferred embodiment.

FIG. 7 shows a side view of the Articulating Constricting Clamp articulated at 10 degrees in the preferred embodiment.

Figure 8:
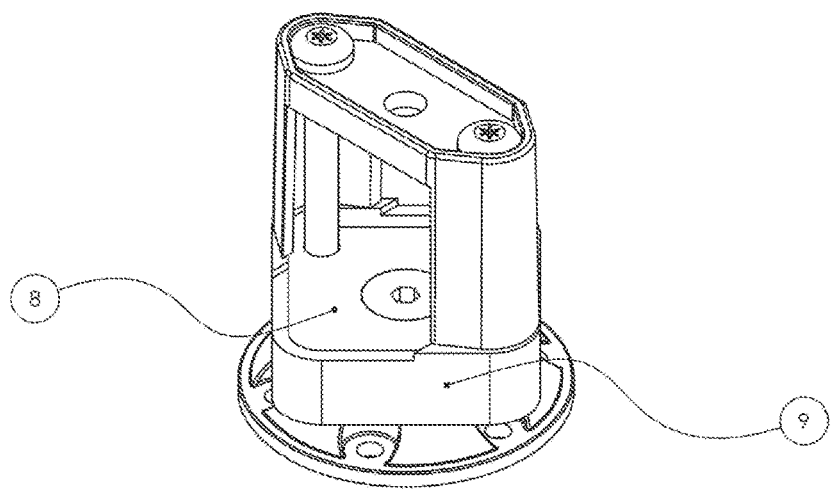
FIG. 8 shows an isometric view of the Articulating Constricting Clamp in an alternate embodiment.

FIG. 8 shows an isometric view of an alternate form of the articulating constricting clamp comprising a square mid clamp (9) and square nut plate (8).

When the countersunk screw (7) is inserted into the nut plate (3) of the preferred embodiment and the nut plate (3) is inserted inside of the mid clamp (1) and set on top of the bulbous base (4), the lug (6) can be threaded onto the countersunk screw (7) loosely allowing the mid clamp (1) to rotate and swivel on the bulbous base (4). A pair of bases may then be mounted on a surface where each bulbous base (4) is not parallel with each other with fasteners going through the mounting holes (10), or the bulbous base (4) can be adhered or fused to the surface. The structure that is to be secured by the articulating constricting clamp is then set onto the mid clamp (1), the top clamp (2) is fitted over the structure to be clamped and then the top clamp screws (5) are placed through the top clamp (2) and threaded into the nut plate (3). The nut plate (3) sits slightly inside of the mid clamp (1) and lower than the pocket cutout (11) for the structure being secured so that when the top plate screws (5) are torqued and tightened, the nut plate (3) will move upwards slightly causing the lug (6) to be pressed against the bottom of the bulbous base (4) while the mid clamp (1) is squeezed between the structure being mounted and the bulbous base (4) thus compressing all of the components together so they are now no longer able to move. If the bulbous base (4) is screwed or bolted to the surface to which it is mounted, the structure that is being clamped will cover the screws in the bulbous base (4) mounting holes (10) making them difficult, if not impossible, to be reached for removal making for a secure mounting of the clamp assembly. If the top clamp screws (5) are peened or crushed at the end after being threaded through the nut plate (3), then the structure being clamped is secured and unable to be removed.

In the alternate embodiment, the mid clamp (1) and nut plate (3) are replaced with the square mid clamp (9) and square nut plate (8). The square mid clamp (9) is made of a ferrous or nonferrous metal and when the articulating constricting clamp assembly is torqued and tightened, the edges will dig into the bulbous base (4) creating a stronger clamping assembly that is harder to move when torqued and tightened.

When assembling the preferred embodiment, with the countersunk hole facing upward, place the nut plate (3) inside of the mid clamp (1). Then place the countersunk screw (7) into the countersunk hole in the nut plate (3) and set this assembly on top of the domed surface of the bulbous base (4) with the countersunk screw (7) extending into the underneath of the bulbous base (4). Hold the assembly in your hand and rotate upside down while holding the countersunk screw and thread on the lug (6) until snug and the mid clamp (1) can swivel and rotate on the bulbous base (4) with slight resistance. Then the assembly's bulbous base (4) can be screwed, bolted, riveted, adhered or fused to any fixed object. Place the tube, device or structure that is being secured in the mid clamp (1) pocket cut out (11) and set on and screw down the top clamp (2) with the top clamp screws (5). Rotate the clamp assembly to the desired angle and firmly tighten the top clamp screws (5) to pull up the nut plate (3) and seat the lug (6) into the bottom of the bulbous base (4) creating a sound and immovable structure.

The invention claimed is:

1. A clamping system comprising a bulbous base and an externally mating receptacle mechanically sandwiched between a lug and fastening plate, the externally mating receptacle being able to swivel and rotate about a surface of the bulbous base, the system also including a top clamp which attaches to the fastening plate with a plurality of fasteners.

2. The clamping system in accordance with claim 1 where said bulbous base is domed and has a plurality of mounting holes.

3. The clamping system in accordance with claim 2 with said bulbous base being made of plastic.

4. The clamping system in accordance with claim 2 where said bulbous base has a central hole providing clearance for a mechanical fastener that attaches the lug and fastening plate.

5. The clamping system in accordance with claim 4 where said central hole is large enough allowing the mating receptacle to pivot more than 10 degrees in any direction.

6. The clamping system in accordance with claim 4 where said lug is round and larger than the central hole in the bulbous base.

7. The clamping system in accordance with claim 4 with said lug being made of metal and internally threaded.

8. The clamping system in accordance with claim 1 where said top clamp is attached to the fastening plate with screws to a plurality of internally threaded holes.

9. The clamping system in accordance with claim 8 where the screws are threaded through the plurality of holes and the protruding threads are disrupted and peened.

10. The clamping system in accordance with claim 6 where the fastening plate has a countersunk hole in which the lug is attached with a countersunk screw.

11. The clamping system in accordance with claim 1 where said receptacle has a central aperture providing clearance for the mechanical fastener that attaches the lug and fastening plate.

12. The clamping system in accordance with claim 1 where said receptacle has a pocket that the fastening plate sets inside.

13. The clamping system in accordance with claim 12 where said pocket allows the fastening plate to sit lower than the surface of the pocket.

14. The clamping system in accordance with claim 1 for attaching to a captive weapon rack.

* * * * *